US010169035B1

(12) United States Patent
Caspi

(10) Patent No.: US 10,169,035 B1
(45) Date of Patent: *Jan. 1, 2019

(54) CUSTOMIZED STATIC SOURCE CODE ANALYSIS

(71) Applicant: INTERNATIONAL BUSINESS MACHINES CORPORATION, Armonk, NY (US)

(72) Inventor: Omer Caspi, Modiin (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/696,300

(22) Filed: Sep. 6, 2017

(51) Int. Cl.
*G06F 9/44* (2018.01)
*G06F 8/73* (2018.01)

(52) U.S. Cl.
CPC ..................................... *G06F 8/73* (2013.01)

(58) Field of Classification Search
None
See application file for complete search history.

(56) References Cited

U.S. PATENT DOCUMENTS

| 2006/0190923 | A1 | 8/2006 | Jubran |
| 2010/0023926 | A1 | 1/2010 | Sugawara et al. |
| 2010/0333069 | A1 | 12/2010 | Chandra et al. |
| 2014/0250429 | A1 | 9/2014 | Greiner et al. |
| 2016/0335168 | A1* | 11/2016 | Freiberg .................. G06F 8/436 |
| 2017/0195458 | A1* | 7/2017 | Parekh .................... G06F 9/547 |

OTHER PUBLICATIONS

List of IBM Patents or Patent Applications Treated as Related; (Appendix P), Filed Nov. 17, 2017; 2 pages.
Omer Caspi " Customized Static Source Code Analysis", U.S. Appl. No. 15/815,879, filed Nov. 17, 2017.

* cited by examiner

*Primary Examiner* — Qamrun Nahar
(74) *Attorney, Agent, or Firm* — Cantor Colburn LLP

(57) ABSTRACT

Technical solutions are described for customized static source code analysis. An example method includes parsing a source code, the parsing comprising identifying an application programming interface (API) call. The method further includes identifying an analysis configuration file corresponding to the API call. Further, the method includes determining, based on the analysis configuration file, a description of the API call and an identification of a target resource invoked by the API call. Further, the method includes generating a static source code analysis report that includes the description of the API call and the identification of the target resource corresponding to the API call.

14 Claims, 5 Drawing Sheets

CUSTOMIZED STATIC SOURCE CODE ANALYSIS

BACKGROUND

The present invention generally relates to an improvement to a computer system such as a system for static source code analysis of a computer program product, and more specifically, to customizing static source code analysis of application programming interface instructions.

Computer program products, including software, are an important aspect of modern life with people relying on software for various day to day and in some cases vital activities. As a consequence, quality of the software is a major concern. Software development is a distributed effort involving tens if not hundreds of developers and many more lines of code. The larger the software project, the greater the number of individuals adding, editing, and testing code. It is recognized that tools are needed in the software development and testing process to allow project managers and other personnel to improve productivity, improve quality, reliability and reduce expenditure.

Typical software analysis tools provide the ability to independently analyze software source code statically and dynamically. Static analysis can identify correctness issues in code without actually executing that code, through techniques such as data flow analysis, value tracking, and the like. Dynamic analysis can provide information pertaining to timing and how much memory is allocated, for example.

Yet, the tools available to quickly identify and prioritize quality issues within software projects are limited. Major advances have been made towards designing techniques to help software developers to improve the quality of the software. However, finding effective quantitative, objective quality measurements of software has remained elusive. Nevertheless, quantitative, objective measurements are needed, since they provide a concrete means to communicate, reproduce, analyze, and compare outcomes, particularly with respect to large scale software projects, commonly referred to as enterprise software.

Typically, analysis tools are used for identifying quality issues in the software source code, however it is desired that the analysis tools also provide features such as enabling quicker modernization of applications and increasing productivity, particularly by understanding what application programming interface calls used in the source code actually do.

SUMMARY

Embodiments of the present invention are directed to an example method for customized static source code analysis. The method includes parsing a source code, the parsing comprising identifying an application programming interface (API) call. The method further includes identifying an analysis configuration file corresponding to the API call. Further, the method includes determining, based on the analysis configuration file, a description of the API call and an identification of a target resource invoked or accessed by the API call. Further, the method includes generating a static source code analysis report that includes the description of the API call and the identification of the target resource corresponding to the API call. For example, the description indicates what the API call is doing.

According to one or more embodiments of the present invention, a system includes a memory, and a processor coupled with the memory, the processor performs a customized static source code analysis of a source code. The customized static source code analysis includes parsing a source code, the parsing comprising identifying an application programming interface (API) call. The analysis further includes identifying an analysis configuration file corresponding to the API call. The analysis further includes determining, based on the analysis configuration file, a description of the API call and an identification of a target resource invoked or accessed by the API call. The analysis further includes generating a static source code analysis report that includes the description of the API call and the identification of the target resource corresponding to the API call.

According to one or more embodiments of the present invention, a computer program product includes a computer readable storage medium having program instructions embodied therewith. The program instructions are executable by a processing circuit to cause the processing circuit to perform customized static source code analysis. The customized static source code analysis includes parsing a source code, the parsing comprising identifying an application programming interface (API) call. The analysis further includes identifying an analysis configuration file corresponding to the API call. The analysis further includes determining, based on the analysis configuration file, a description of the API call and an identification of a target resource invoked or accessed by the API call. The analysis further includes generating a static source code analysis report that includes the description of the API call and the identification of the target resource corresponding to the API call.

Additional aspects of the one or more technical solutions described herein are described further.

BRIEF DESCRIPTION OF THE DRAWINGS

The examples described throughout the present document will be better understood with reference to the following drawings and description. The components in the figures are not necessarily to scale. Moreover, in the figures, like-referenced numerals designate corresponding parts throughout the different views.

DETAILED DESCRIPTION

Figure 1:
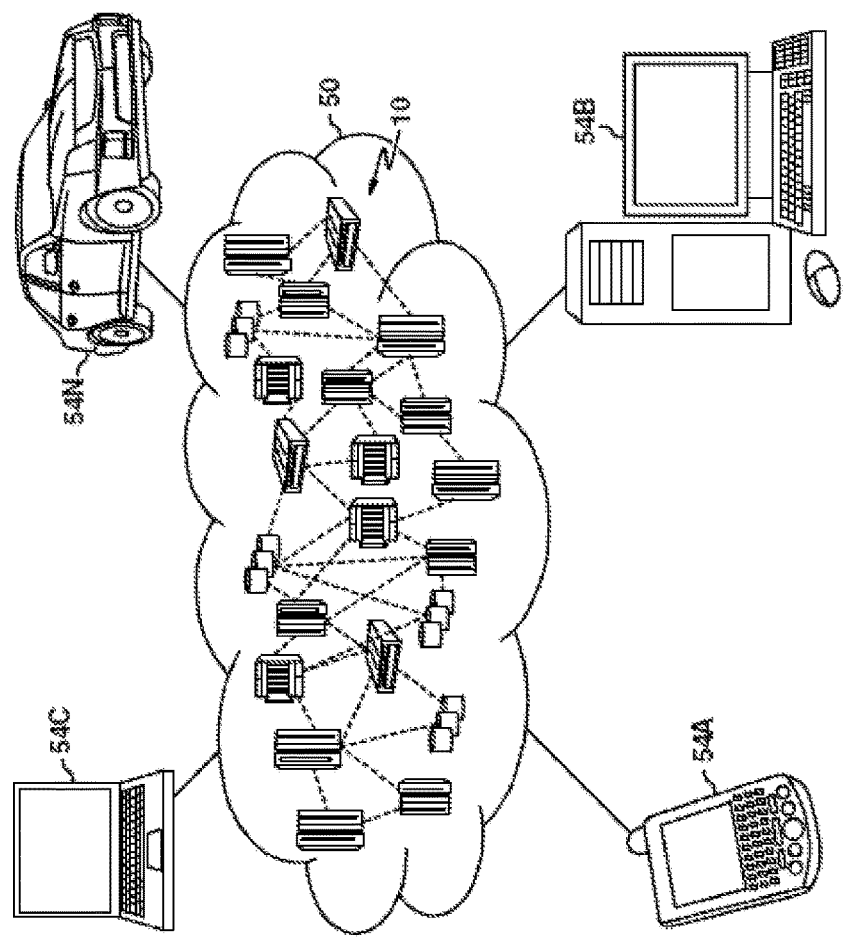
FIG. 1 depicts a cloud computing environment according to an embodiment of the present invention.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The technical solutions described herein facilitate customizing static source code analysis of application programming interface (API) instructions. In one or more examples, the technical solutions described herein use configuration information and user-exits for performing the static source code analysis, without having an end-user of a static source code analysis system to get involved with development efforts with respect to the static source code analysis system.

An enterprise software application often uses API instructions to facilitate access to data, transfer control flow, messaging with other application(s), messaging a remote device, and the like. The API instructions may be calls to functions within the same enterprise software application or to API instructions provided by other third party software application(s). Static source code analysis systems analyze the source code of the enterprise software application to provide an analysis output to facilitate an understanding of and provide insights into the design of the enterprise software application, for example, structure and behavior of the enterprise software application. A technical challenge with providing such an analysis output is that such API instructions are like a black-box and the analysis output is unable to provide insights regarding such instructions in the source code of the enterprise software application.

Typically, if the enterprise software application uses API instructions, source code analysis systems are adapted by ensuing product development efforts, for example writing source code for the analysis system, to support analyzing the API instruction. Such a process is resource intensive and time-consuming, resulting in the lack of out-of-the-box support for API analysis. Alternatively, the static source code analysis system may allow users to configure the source code of the enterprise application in order to alter or augment the analysis behavior. Specifically, the analysis system may allow configuring analysis reports and configuring how pre-processed source code is to be handled. However, this also encompasses substantial additional efforts to configure the source code for each and every API. Further, with a variety of API instructions for multiple internal/external services and programs, the typical solutions, such as adapting the analysis system for each and every API, or configuring each and every line in the source code, is a technical challenge.

The technical solutions described herein address the technical challenge by facilitating end users of a static source code analysis system to define the behavior of the system when analyzing API calls within the enterprise application, by providing customized configuration information and creating user exit routines for specific API instructions. The technical solutions thus facilitate for distributed quicker support, where each end user can configure his/her own required support for specific API instructions, be it from an in-house and/or 3rd party API for a service, program, database, remote machine, or the like. In addition, disconnecting the API configuration from the source code of the analysis system itself facilitates the end-user to quickly modify the analysis behavior upon a change in the defined API, avoiding the wait for the analysis system to cater and catch up with such changes in the API.

The technical solutions described herein may be implemented using cloud computing in one or more examples. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
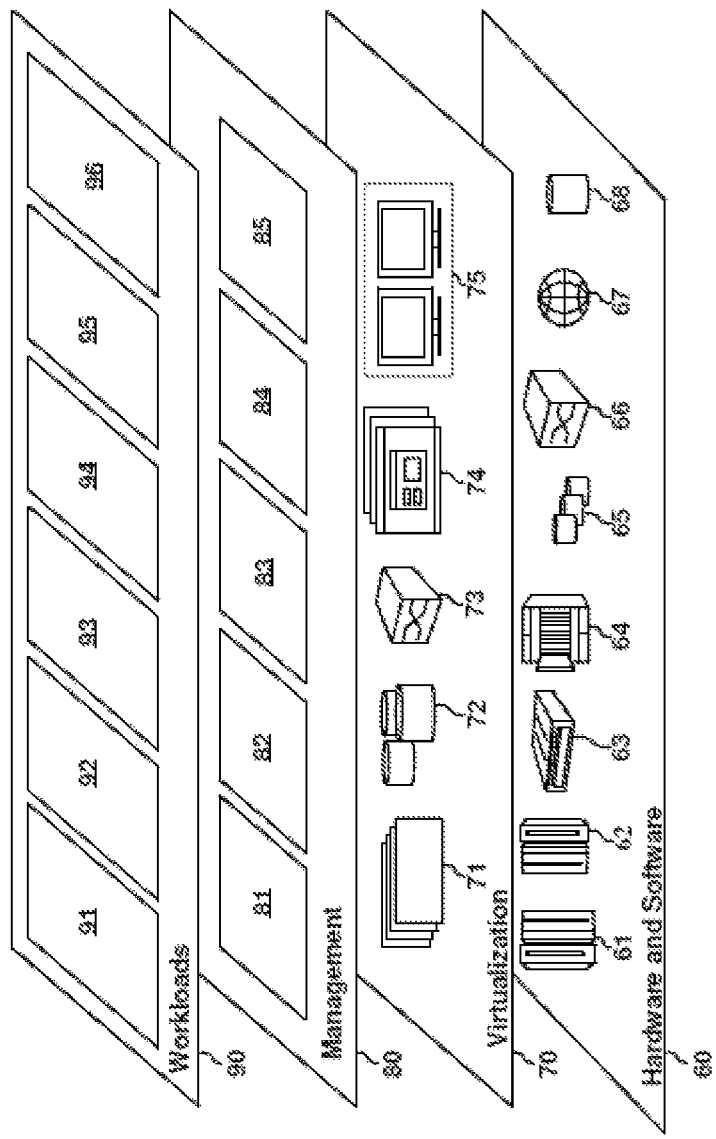
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and source code analysis 96.

Turning now to an overview of technologies that are more specifically relevant to aspects of the invention, traditional techniques for static source code analysis, which includes analyzing source code without executing it. Such static source code analysis is used to find bugs, ensure conformance to coding guidelines, among other functions. For example, static code analysis may facilitate finding lexical, syntactic and even some semantic mistakes. Example analysis systems that provide static source code analysis include, but are not limited to, IBM® Security AppScan®, Fortify 360 SCA™ FindBugs™, CodeSonar™ etc. Static analysis is used to help maintain code quality, and are typically integrated into the build process. Static analysis output allows end users to reason about various possible executions of a program, in this case the enterprise application. The analysis output may give assurance about any execution prior to deployment and facilitates end-users to handle developer confusion, false positives, etc. Accordingly, the technical solutions described herein improve the static source code analysis systems and methods to provide detailed information about API instructions in the source code, based on a customized configuration provided by an end-user for the API instructions. Further, the technical solutions described herein facilitate the static source code analysis systems to execute user-exits in response to specific API instructions being encountered to generate customized analysis output for the specific API instructions.

Figure 3:
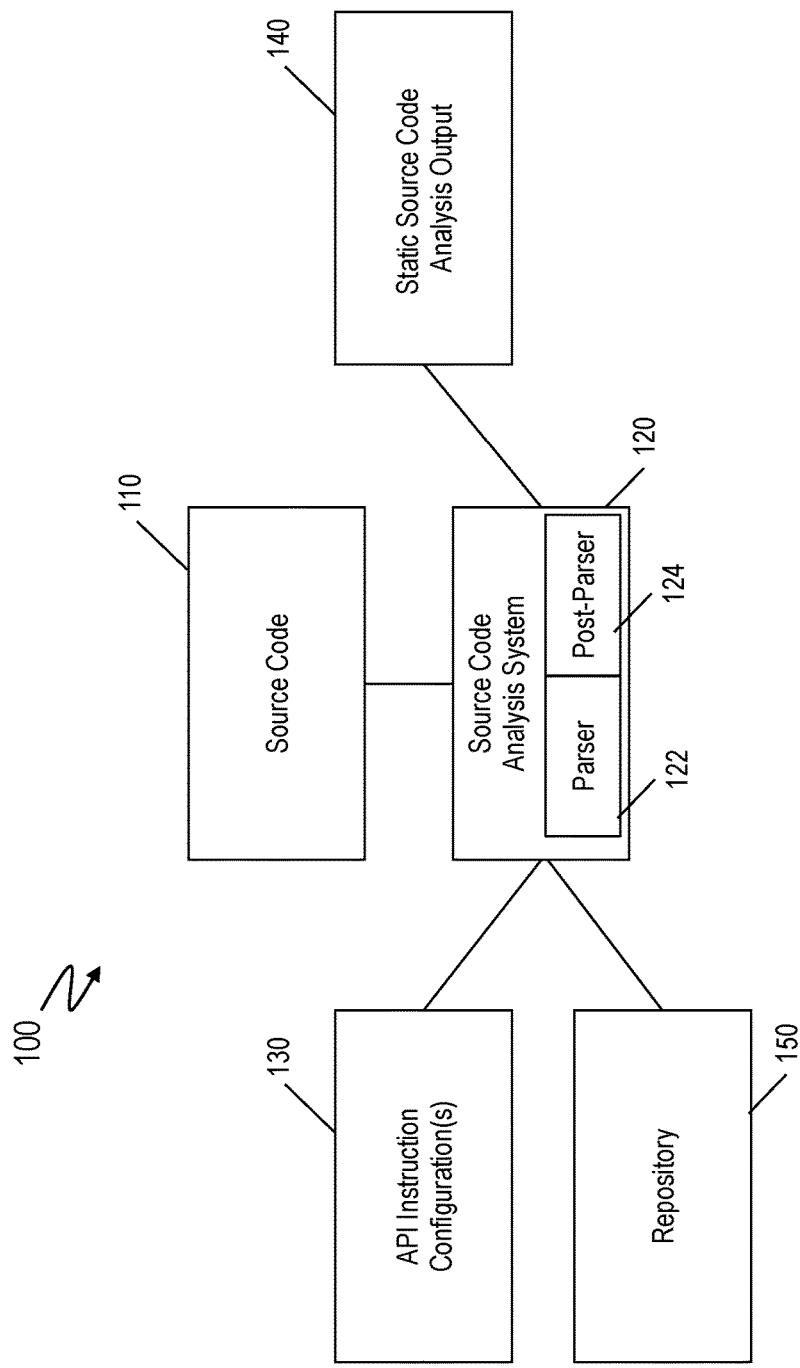
FIG. 3 depicts an example system for static code analysis according to one or more embodiments.

FIG. 3 depicts an example system 100 for static code analysis according to one or more embodiments. The system includes a source code analysis system 120 that analyzes the source code 110 of a computer program product, such as an enterprise application, or any other software product. The analysis system 120 performs a static source code analysis of the source code 110 and generates a static source code analysis output 140, such as an analysis report. The output 140 may further include one or more notifications to an end-user, such as a developer, project manager, or any other personnel indicating one or more findings from the static source code analysis performed. Further, the analysis output 140 may include a report, a graph, and various other outputs as part of the analysis.

The analysis system 120 further analyzes one or more API instructions (API calls) embedded in the source code 110. In one or more examples, the analysis system 120 uses API analysis configuration(s) 130 to analyze the API instructions. The API analysis configuration 130 may include one or more files. For example, the API analysis configuration 130 may include a configuration file for each API instruction to be analyzed in the source code 110. Alternatively, or in addition, a configuration file from the API analysis configuration 130 may correspond to one or more API instructions from the source code 110.

The configuration file includes configuration data for the API instruction to be used for the static analysis of the API instruction. For example, the configuration data includes one or more of an API description, a mapping data, and a user exit reference, among other data.

For example, the API description includes a name of API call, a type of API call, parameters to be resolved out of the call, the type of each parameter (program name, table name, file name, access type, destination of message and so on).

Further, the mapping data section includes mapping data per each parameter of the API that is to be resolved. The mapping data provided facilitates indirect values to be resolved. For example, if the API call specified a service name, the mapping data provides a mapping between the service name and the invoked program name, for example, a name of a process being invoked. Another example includes for an API call that specifies a database name that maps to a table name to resolve the actual data location.

The user exit reference includes an identification of a script that includes a business logic to execute using the data associated with the API instruction.

The configuration data thus provides instructions on how to interpret the API calls, that is how to resolve information for different types of APIs that are to be custom analyzed according to the analysis configuration 130.

For example, for control flow APIs, the configuration data includes identity of the called target, for example program name, filename, and the like. For example, if the API call invokes an operation from a second software application, such as a service, a program, or any other type of second application, the configuration data includes identification information for the target second application. In addition, the configuration data may include a version number, a filename or other details regarding the target.

Further, for external data access APIs, the configuration data includes identity for resolving the data source and access type of data being accessed by the API call. For example, if the API call accesses a data-item from a database, such as from a table, or any other data structure within the database, the configuration data includes identification information for resolving the target data-item. In addition, the configuration data may include a version number, a filename or other details regarding the database from which the data-item is being accessed.

For example, consider the situation where the target resource accesses a particular version of a database. If, when updating the source code 110 the end-user changes the API call to a different, newer version of the database, that is not supported by the version of the database that is presently in use, the analysis output 140 indicates the discrepancy to the end-user, who can then avoid a bug with the source code by reverting the source code 110 to the older version's API. Alternatively, or in addition, the system 100 flags the change in the API call in the analysis output 140 to notify the end-user of a potential mismatch. Alternatively, or in addition, in one or more examples, the system 100 may facilitate automatically updating the API call to the one supported by the database version in use. It should be noted that the above example illustrates the system 100 being used in case of the target resource being a database, but the system 100 makes similar adjustments to the source code 110 and/or the analysis output 140 when the target resource is of any other type, such as a second program, a remote machine, and the like. The system 100 thus improves the computing technology by facilitating identifying potential bugs, and further adjusting source code 110 to address such potential bugs.

Further, for internal data APIs, the configuration data includes identity for resolving relationships between internal data items of the source code 110 itself.

Further yet, for messaging APIs (e.g. enterprise service bus), the configuration data includes identification for the remote location (such as remote server's IP address, server name, MAC address, and the like) as well as information about a remote application for which the message is being sent. For example, the messaging API may be used in a communication system between mutually interacting software applications, for example in a service-oriented architecture using distributed computing. In one or more examples, the messaging API call may invoke an asynchronous operation at the remote location.

In one or more examples, the analysis configuration 130 includes configuration files for different users, for example a first configuration file for a first user and a second configuration file for a second user. The two files may include different sets of selected API calls from the source code 110 that are to be custom analyzed. For example, the first user may select a first set of API calls {A1, A2, A3} for customized analysis, while the second user may select a second set of API calls {A1, A4, A6} for customized analysis. It should be noted that above are just examples and that in other examples, the selected sets of API calls may include additional, fewer, or different number of API calls. Further, the configuration files for the respective users may include different configuration data for the same API call. For example, in the above example scenario, the first configuration file for the first user may include a different configuration data for the API call A1 from the configuration data added by the second user in the second configuration file. Thus, the analysis output of the API call A1 for the first user is different from that for the second user.

In one or more examples, the analysis system 120 includes a parser 122 and a post-parser 124. The parser 122 parses the source code 110 and adds information about the parsed data into a repository 150. The stored information is later processed to make a resolution regarding the source code instruction usage. For example, stored information includes information such as the called function, dynamic values sent to the call as resolved from the source code analysis, variables sent to the called function and so on.

In addition, the parser 122 identifies the API instructions that have a matching configuration data in the API analysis configuration 130. For example, the parser compares the API instruction or at least part of the API instruction, such as the function name being called, with the analysis configuration 130. The analysis configuration 130 includes a definition of the API call, for the parser 122 to differentiate API calls to be custom analyzed from standard calls.

In case of a matching API instruction, the parser 122 reads the configuration data and stores the configuration data in the repository 150, instead of the parsed data as in case of a standard program call. In one or more examples, the parsed data for the API call is also stored in the repository 150.

The post-parser 124 analyzes the parsed information stored in the repository 150 by the parser 122 to generate the analysis output 140. The post parsing analysis includes reading information from the repository 150, using the mapping data to include the targets of the API instruction and other details of the target resource(s) being used by the API instruction in the analysis output 140. The post-parsing further includes invoking a user-exit script if one exists for an API instruction. In one or more examples, the user-exit script is executed to determine the API usage, such as the target resources being invoked and the results from the user-exit script are stored into the analysis output 140, and/or into the repository 150. Thus, the analysis output 140 includes the final resolved target of a control flow API call, the data source name and access type of a data layer API call, a remote machine and application identification in case of a messaging API, and so on.

Further, by splitting the analysis into parsing and post-parsing, the analysis system 120 facilitates a quick update of the repository 150 in case the configuration data 130 is changed by the end-user, without having to parse the source code 110 again. Post-parsing execution is relatively much faster than the parsing and thus, can be invoked again once the configuration 130 is changed by an end-user, however parsing is a high workload process and repeated execution of the parsing may not be recommended.

Figure 4:
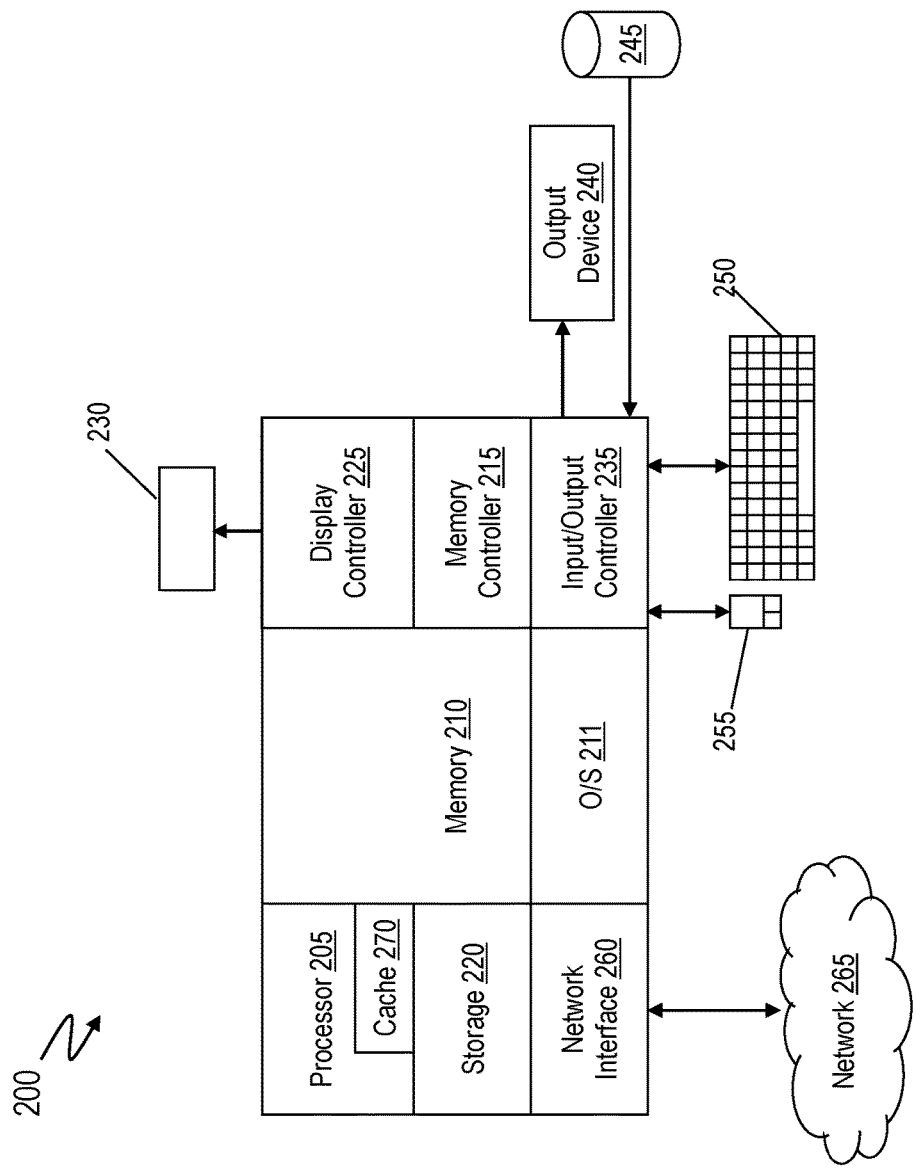
FIG. 4 illustrates an example system according to one or more embodiments.

FIG. 4 illustrates an example system 200 according to one or more embodiments. The system 200 may be a communication apparatus, such as a computer. For example, the system 200 may be a desktop computer, a tablet computer, a laptop computer, a phone, such as a smartphone, a server computer, or any other device that communicates via a network 265. In one or more examples, the system 200 is the analysis system 120.

The system 200 includes, among other components, a processor 205, memory 210 coupled to a memory controller 215, and one or more input devices 245 and/or output devices 240, such as peripheral or control devices that are communicatively coupled via a local I/O controller 235. These devices 240 and 245 may include, for example, battery sensors, position sensors, indicator/identification lights and the like. Input devices such as a conventional keyboard 250 and mouse 255 may be coupled to the I/O controller 235. The I/O controller 235 may be, for example, one or more buses or other wired or wireless connections, as are known in the art. The I/O controller 235 may have additional elements, which are omitted for simplicity, such as controllers, buffers (caches), drivers, repeaters, and receivers, to enable communications.

The I/O devices 240, 245 may further include devices that communicate both inputs and outputs, for instance disk and tape storage, a network interface card (MC) or modulator/demodulator (for accessing other files, devices, systems, or a network), a radio frequency (RF) or other transceiver, a telephonic interface, a bridge, a router, and the like.

The processor 205 is a hardware device for executing hardware instructions or software, particularly those stored in memory 210. The processor 205 may be a custom made or commercially available processor, a central processing unit (CPU), an auxiliary processor among several processors associated with the system 200, a semiconductor based microprocessor (in the form of a microchip or chip set), a macroprocessor, or other device for executing instructions. The processor 205 includes a cache 270, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 270 may be organized as a hierarchy of more cache levels (L1, L2, and so on.).

The memory 210 may include one or combinations of volatile memory elements (for example, random access memory, RAM, such as DRAM, SRAM, SDRAM) and nonvolatile memory elements (for example, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 210 may incorporate electronic, magnetic, optical, or other types of storage media. Note that the memory 210 may have a distributed architecture, where various components are situated remote from one another but may be accessed by the processor 205.

The instructions in memory 210 may include one or more separate programs, each of which comprises an ordered listing of executable instructions for implementing logical functions. In the example of FIG. 2, the instructions in the memory 210 include a suitable operating system (OS) 211. The operating system 211 essentially may control the execution of other computer programs and provides scheduling, input-output control, file and data management, memory management, and communication control and related services.

Additional data, including, for example, instructions for the processor 205 or other retrievable information, may be stored in storage 220, which may be a storage device such as a hard disk drive or solid state drive. The stored instructions in memory 210 or in storage 220 may include those enabling the processor to execute one or more aspects of the systems and methods described herein.

The system 200 may further include a display controller 225 coupled to a user interface or display 230. In some embodiments, the display 230 may be an LCD screen. In other embodiments, the display 230 may include a plurality of LED status lights. In some embodiments, the system 200 may further include a network interface 260 for coupling to a network 265. The network 265 may be an IP-based network for communication between the system 200 and an external server, client and the like via a broadband connection. In an embodiment, the network 265 may be a satellite network. The network 265 transmits and receives data between the system 200 and external systems. In some embodiments, the network 265 may be a managed IP network administered by a service provider. The network 265 may be implemented in a wireless fashion, for example, using wireless protocols and technologies, such as WiFi, WiMax, satellite, or any other. The network 265 may also be a packet-switched network such as a local area network, wide area network, metropolitan area network, the Internet, or other similar type of network environment. The network 265 may be a fixed wireless network, a wireless local area network (LAN), a wireless wide area network (WAN) a personal area network (PAN), a virtual private network (VPN), intranet or other suitable network system and may include equipment for receiving and transmitting signals.

Figure 5:
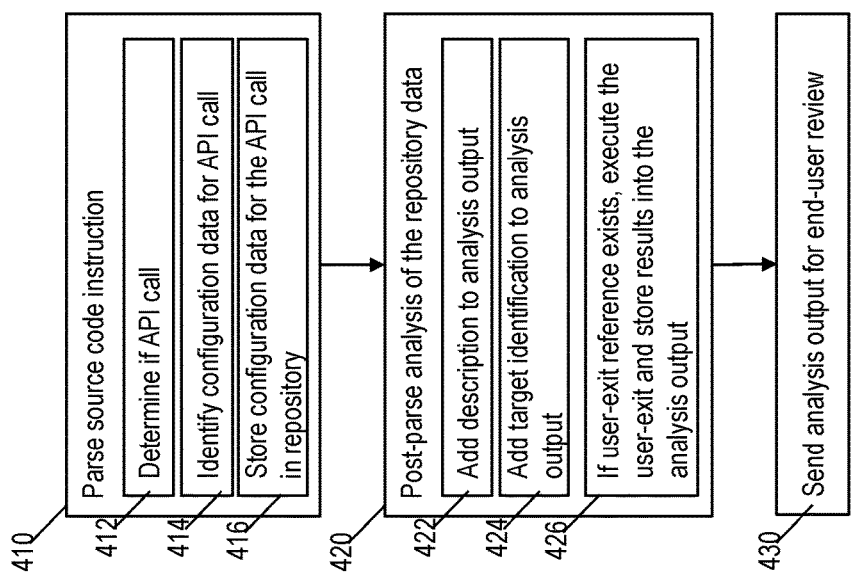
FIG. 5 illustrates a flowchart of an example method for customizing static source code analysis of application programming interface instructions according to one or more embodiments.

FIG. 5 illustrates a flowchart of an example method for static code analysis according to one or more embodiments. The method includes parsing the instructions from the source code 110, as shown at block 410. The parsing includes determining if the instruction is an API call, to invoke a function/macro/data-item within the source code 110 itself, or to a function/macro/data-item external to the source code 110, as shown at block 412. In one or more examples, the parser makes the determination based on the list of selected API calls in the analysis configuration 130 for the user executing the analysis. In one or more examples, the end-user identifies the analysis configuration 130 to be used for the customized static analysis.

The parsing further includes identifying configuration data for the API call from the analysis configuration information 130, as shown at block 414. For example, the parser 122 matches the API call with the configuration information 130. In one or more examples, the matching is based on the name of the API call, such as the function name.

The parsing further includes store configuration data for the API call in the repository 150, as shown at block 416. As noted earlier, if the parsed instruction is not an API call that is present in the configuration information, the parsed information stores default information such as of the tokens parsed from the instruction. In case the parsed instruction is an API call that is to be analyzed in a customized manner, the parser 122 stores the configuration data for the API call into the repository 150. In one or more examples, the configuration data is stored in addition to default token information that the parser 122 generates. For example, an entry for the API call in the repository 150 stores the description data, the mapping data, and the user-exit reference from the configuration data for the API call.

Thus, as part of the code parsing, whenever the parser 122 encounters a function call, the analysis configuration 130 is used to identify whether the call is an API call to be custom analyzed or a standard function call. In case of an API call that is to be custom analyzed, the information in the configuration 130 is used in order to resolve the dynamic values that are relevant for the API call and further, the parser stores into the repository 150 the indication about the API invocation, together with the dynamic values and variable usage for the API call.

Referring back to FIG. 5, the parsed information is analyzed by the post-parser 124, as shown at block 420. The post-parsing includes retrieving the information stored in the repository 150 to generate the analysis output 140. For example, the post-parsing includes adding the description of the API call to the analysis output 140, as shown at block 422. For example, the description may include a verbose description of the API call, such as describing a purpose for the call, among other information. Because the configuration 130 is specific to each end-user, different end-users may add customized description that facilitates analyzing the source code 110 in a personal and customized manner.

Further, the post-parsing includes adding target identification of the API call to the analysis output 140, as shown at block 424. For example, the post-parser 124 resolves the target resource being used by the API call using the mapping information from the configuration data for the API call and adds the resolved target information into the analysis output 140.

Further yet, the post-parsing includes determining if the configuration data of the API call includes a user-exit reference and if one exists, executing the user-exit script, as shown at block 426. The user-exit reference identifies a script file that includes a logic to be executed for the API call. The post-parses 124 waits for the user-exit script to complete execution and stores the results of the user-exit into the analysis output 140 and/or the repository 150. For example, the user-exit script may be used to resolve the target resource(s) used by the API call. In one or more examples, the user-exit is dynamically created by the system 100 to resolve the target resource details based on the parsed information.

For example, if the parsed information indicates that the API call is for a particular program, a dynamic script may be created for execution in response to the user-exit, the script identifying the program name and filename associated with the API call. Accordingly, if at a later date the program and/or the file associated with the API call is removed from the system executing the source code 110, the end-user can determine a cause of a failure in the execution that attempts to access the program/file with the API call. In one or more examples, the analysis output 140 flags the missing file/program for the end-user to identify the potential bug/error in the source code execution. It should be noted that although the above example is about an API call for a different program, the system 100 facilitates making similar adjustments in case of other types of API calls, such as for a database, a remote machine, an internal control flow, and the like.

In one or more examples, the user exit is used to resolve target resource related data to be provided in the API analysis output 140, in case the target resource related data cannot be resolved directly from the source code 110 or the configuration 130, such as from the mapping data. For example, for external calls outside of the analyzed application, the target resource related data may include the target program name of the call. Further, in case of a data access API, the user-exit may be used to identify a data target name, access type, data fields referenced and so on. Further, in case of messaging API calls, the user-exit may be used to determine information about the target of the API call, such as system details, queue name etc. and other information used for the resolution.

Thus, as part of the post parsing analysis, the information stored by the parser 122 in the repository 150 is retrieved, together with additional information from the analysis configuration 130. In one or more examples, the mapping data is read and/or user exits are invoked, to determine the target resources for the API calls, such as program into which the control flow should be transferred, data table/file that is accessed, access type, target of a message API and so on. The target resolution is stored into the repository 150 to be available at analysis time. Alternatively, or in addition, the target resolution is added into the analysis output.

Referring back to FIG. 5, the method further includes sending the analysis output 140 the end-user, as shown at block 430. The analysis output 140 includes the related information of the API call, for example including information about invoked target resources, including a description of the API call. Thus, the analysis output 140, which may be displayed for the user to review provides the end-user detailed information about the API call and the target resources being accessed by API calls that are in the source code 110. Because the description added is customized by the end-user, the analysis output is customized according to the end-user's preferences. Further, because the target resolution is performed only in cases of API calls that the end-user had added into the analysis configuration 130, the analysis output 140 is further customized to only include information for the API calls selected by the end-user.

The technical solutions described herein thus facilitate an analysis system/method for static source code analysis of an application's API call usage. The technical solutions further facilitate end users of the source code analysis to define behavior of the source code analysis when analyzing the API calls using configuration data, rather than having to make code changes to the source code analysis system itself. In one or more examples, the technical solutions facilitate the end-user to create an API configuration data, such as in a file that selects the API calls to be custom analyzed and further includes instructions on how to interpret the API calls during the static source code analysis. During the source code analysis, the source code is parsed and when the API call is encountered, the analysis system checks the configuration file to determine whether the API call is part of the selected API call for customized static code analysis or another API call for a standard static code analysis. If the encountered API call is from the selected API calls, the analysis system uses the API configuration file to resolve dynamic values for the API call, and stores information about the API invocation, values, and usage in a repository and/or in an analysis output.

The technical solutions described herein thus provide an improvement to computer technology by improving static source code analysis that is routinely performed when developing/engineering computer program products. Further, the technical solutions facilitate automatically creating user scripts to resolve target resources being used in API calls within a source code. Further yet, the technical solutions facilitate automatically adjusting the source code and/or analysis output to address potential bugs/errors in the source code.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technical solutions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are to be construed in the broadest sense, superseding any other implied definitions hereinbefore or hereinafter unless expressly asserted to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

The descriptions of the various embodiments of the technical features herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
   a memory; and
   a processor coupled with the memory, the processor configured to perform a customized static source code analysis of a source code, the customized static source code analysis comprising:
      parsing a source code, the parsing comprising identifying a first application programming interface (API) call, and a second API call;
      identifying a first analysis configuration file corresponding to the first API call, and a second analysis configuration file corresponding to the second API call;

determining, based on the first analysis configuration file, a description of the first API call and an identification of a first target resource invoked by the first API call;

determining, based on the second analysis configuration file, a second description of the second API call and an identification of a second target resource invoked by the second API call; and generating a static source code analysis report that includes the description of the first API call and the identification of the first target resource corresponding to the first API call, and the description of the second API call and the identification of the second target resource corresponding to the second API call.

2. The system of claim 1, wherein the first analysis configuration file comprises mapping data to resolve the first target resource based on a type of the first API call.

3. The system of claim 2, wherein the type of the first API call is one from a group of types of API calls consisting of control flow API, external data access API, internal data API, and messaging API.

4. The system of claim 2, wherein the mapping data comprises a program name in response to the first target resource being a service.

5. The system of claim 2, wherein the mapping data comprises a table identifier in response to the first target resource being a data-item from a database.

6. The system of claim 2, wherein the mapping data comprises a remote machine identifier in response to the first API call being a messaging API that invokes a remote resource.

7. The system of claim 1, wherein determining the first target resource further comprises:
in response to a mapping data from the first analysis configuration file including a user-exit reference:
executing a script corresponding to the user-exit reference; and
determining the first target resource from a result of the script.

8. A computer program product comprising a computer readable storage medium having program instructions embodied therewith, the program instructions executable by a processing circuit to cause the processing circuit to perform customized static source code analysis, the customized static source code analysis comprising:
parsing a source code, the parsing comprising identifying a first application programming interface (API) call, and a second API call;
identifying a first analysis configuration file corresponding to the first API call, and a second analysis configuration file corresponding to the second API call;
determining, based on the first analysis configuration file, a description of the first API call and an identification of a first target resource invoked by the first API call;
determining, based on the second analysis configuration file, a second description of the second API call and an identification of a second target resource invoked by the second API call; and
generating a static source code analysis report that includes the description of the first API call and the identification of the first target resource corresponding to the first API call, and the description of the second API call and the identification of the second target resource corresponding to the second API call.

9. The computer program product of claim 8, wherein the first configuration file comprises:
a program name in response to the first target resource being a service;
a table identifier in response to the first target resource being a data-item from a database; and
a remote machine identifier in response to the first API call being a messaging API that invokes a remote resource.

10. The computer program product of claim 8, wherein determining the first target resource further comprises:
in response to a mapping data from the first analysis configuration file including a user-exit reference:
executing a script corresponding to the user-exit reference; and
determining the first target resource from a result of the script.

11. The computer program product of claim 8, wherein the first analysis configuration file comprises mapping data to resolve the first target resource based on a type of the first API call.

12. The computer program product of claim 11, wherein the type of the API call is one from a group of types of API calls consisting of control flow API, external data access API, internal data API, and messaging API.

13. The computer program product of claim 8, wherein the first analysis configuration file is corresponding to a first user, the static source code analysis report is a first static source code analysis report, and wherein the customized static source code analysis further comprising:
parsing the source code, the parsing comprising identifying said first API call;
identifying a third analysis configuration file corresponding to said first API call; and
determining, based on the third analysis configuration file, a second description of said first API call and a second identification of said first target resource invoked by said first API call; and
generating a second static source code analysis report that includes the second description of said first API call and the second identification of said first target resource.

14. The system of claim 1, wherein the first analysis configuration file is corresponding to a first user, the static source code analysis report is a first static source code analysis report, and wherein the customized static source code analysis further comprising:
parsing the source code, the parsing comprising identifying said first API call;
identifying a third analysis configuration file corresponding to said first API call; and
determining, based on the third analysis configuration file, a second description of said first API call and a second identification of said first target resource invoked by said first API call; and
generating a second static source code analysis report that includes the second description of said first API call and the second identification of said first target resource.

* * * * *